US008577367B2

(12) United States Patent
Ishihara

(10) Patent No.: US 8,577,367 B2
(45) Date of Patent: Nov. 5, 2013

(54) WIRELESS TERMINAL DEVICE AND CONTROL METHOD

(75) Inventor: Futoshi Ishihara, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 161 days.

(21) Appl. No.: 13/334,272

(22) Filed: Dec. 22, 2011

(65) Prior Publication Data

US 2012/0165014 A1 Jun. 28, 2012

(30) Foreign Application Priority Data

Dec. 22, 2010 (JP) ................................ 2010-286402

(51) Int. Cl.
*H04W 4/00* (2009.01)
*H04W 40/00* (2009.01)

(52) U.S. Cl.
USPC ........................................ 455/435.2; 455/448

(58) Field of Classification Search
USPC ................ 455/435.2, 426.1, 450, 434, 552.1, 455/553.1, 436–442; 370/338, 328
See application file for complete search history.

(56) References Cited

U.S. PATENT DOCUMENTS

| | | | | |
|---|---|---|---|---|
| 8,472,961 | B2 * | 6/2013 | Makabe | 455/437 |
| 2010/0195568 | A1 * | 8/2010 | Iimori | 370/328 |
| 2010/0317378 | A1 * | 12/2010 | Fang et al. | 455/466 |
| 2011/0122809 | A1 * | 5/2011 | Yun et al. | 370/328 |
| 2011/0151865 | A1 * | 6/2011 | Lau et al. | 455/433 |
| 2011/0222509 | A1 * | 9/2011 | Lee | 370/331 |
| 2011/0305192 | A1 * | 12/2011 | Faccin et al. | 370/328 |

FOREIGN PATENT DOCUMENTS

JP 2009-267996 A 11/2009

OTHER PUBLICATIONS

Technical Specification Group Services and System Aspects; Circuit Switched (CS) fallback in Evolved Packet System (EPS); Stage 2; 3GPP TS 23.272, V10.1.0 (Sep. 2010).

* cited by examiner

*Primary Examiner* — Brandon Miller
(74) *Attorney, Agent, or Firm* — Hoffman & Baron, LLP

(57) ABSTRACT

The cellular telephone device includes a reporting unit and a synchronization unit. In a case in which a communication request occurs in a 3G system in a state where the location registration is performed in an LTE system, the reporting unit reports the communication request, together with data for identifying the 3G system, to the LTE system. The synchronization unit receives synchronization information of a communication channel in the 3G system identified by the LTE system based on such data reported from the reporting unit, and establishes synchronization with the communication channel.

12 Claims, 4 Drawing Sheets

CELLULAR TELEPHONE DEVICE 1
LTE CONTROL UNIT
3G CONTROL UNIT
UTILIZE LTE NETWORK S21
OUTGOING VOICE CALL REQUEST S22
S23 OUTGOING CALL REQUEST
S24 REPORT OUTGOING CALL REQUEST
S25 AUTHENTICATION PROCESSING
S26 DETERMINE ALLOCATION OF COMMUNICATION CHANNEL
S27 REPORT COMMUNICATION CHANNEL
S28 ALLOCATE COMMUNICATION CHANNEL
S29 ESTABLISH SYNCHRONIZATION WITH COMMUNICATION CHANNEL
S30 PERFORM VOICE COMMUNICATION ON 3G NETWORK
RETURN TO LTE NETWORK S31

WIRELESS TERMINAL DEVICE AND CONTROL METHOD

This application is based on and claims the benefit of priority from Japanese Patent Application No. 2010-286402, filed on 22 Dec. 2010, the content of which is incorporated herein by reference.

BACKGROUND OF THE INVENTION

1. Field of the Invention

The present invention relates to a wireless terminal device that can communicate in a plurality of communication systems, and to a method of controlling the wireless terminal device.

2. Related Art

In recent years, in addition to a communication system of a 3G standard (for example, CDMA) that is a CS (Circuit Switched) standard, a communication system of an LTE (Long Term Evolution) standard has been introduced as a communication system utilized by a wireless terminal device such as a cellular telephone device.

A CS Fallback function is defined in 3GPP TS 23.272, and by way of this function, an incoming call request from the CDMA can be reported via the LTE system (for example, see Japanese Unexamined Patent Application, Publication No. 2009-267996, and 3GPP TS 23.272 V10.1.0, "Circuit Switched (CS) fallback in Evolved Packet System (EPS), Stage2" 2010-09).

SUMMARY OF THE INVENTION

An object of the present invention is to provide a wireless terminal device that performs highly convenient communication, and a method of controlling such a wireless terminal device.

A wireless terminal device according to the present invention is a wireless terminal device that performs wireless communication by selecting any one of a first communication system or a second communication system, and the wireless terminal device includes: a reporting unit that reports data for identifying the second communication system to the first communication system, in a case in which a communication request occurs in the second communication system in a state where a location registration is performed in the first communication system; and a synchronization unit that receives, from the first communication system, synchronization information of a communication channel in the second communication system allocated based on data reported from the reporting unit, and establishes synchronization with the communication channel.

Moreover, a wireless terminal device according to the present invention is a wireless terminal device that performs wireless communication by selecting any one of a first communication system or a second communication system, and the wireless terminal device includes: a reporting unit, wherein, in a case in which an incoming call occurs in the second communication system in a state where a location registration is performed in the first communication system, the reporting unit receives an incoming call report regarding the incoming call in the first communication system, and reports data for identifying the second communication system to the first communication system in response to the incoming call report; and a synchronization unit that receives, from the first communication system, synchronization information of a communication channel in the second communication system allocated based on data reported from the reporting unit, and establishes synchronization with the communication channel.

In addition, the second communication system is preferably one of a plurality of communication systems that use a prescribed communication method.

Furthermore, the synchronization unit preferably receives, as the synchronization information, together with data for identifying a communication channel, an offset amount of system time of the second communication system relative to system time of the first communication system.

Moreover, the synchronization unit preferably establishes synchronization with a base station in a calling zone of the second communication system corresponding to a calling zone of the first communication system, based on mapping data of a CS Fallback function maintained in the first communication system and defined in 3GPP TS 23.272.

In addition, the wireless terminal device according to the present invention further includes a detachable contract information recording medium, in which the reporting unit preferably generates data for identifying the second communication system, based on information on a contracted communication common carrier recorded in the contract information recording medium.

A control method according to the present invention is a control method for a wireless terminal device that performs wireless communication by selecting any one of a first communication system or a second communication system, and the method includes: a reporting step of reporting data for identifying the second communication system to the first communication system, in a case in which a communication request occurs in the second communication system in a state where a location registration is performed in the first communication system; and a synchronization step of receiving, from the first communication system, a communication channel in the second communication system allocated based on data reported in the reporting step, and establishing synchronization with the communication channel.

Furthermore, a control method according to the present invention is a control method for a wireless terminal device that performs wireless communication by selecting any one of a first communication system or a second communication system, and the method includes: a reporting step, wherein, in a case in which an incoming call occurs in the second communication system in a state where a location registration is performed in the first communication system, an incoming call report regarding the incoming call is received in the first communication system, and data for identifying the second communication system is reported to the first communication system in response to the incoming call report; and a synchronization step of receiving, from the first communication system, synchronization information of a communication channel in the second communication system allocated based on data reported in the reporting step, and establishing synchronization with the communication channel.

According to the present invention, highly convenient communication can be performed in a wireless terminal device.

DETAILED DESCRIPTION OF THE INVENTION

A description is provided hereinafter for an example of a preferred embodiment of the present invention. It should be noted that, in the present embodiment, a cellular telephone device 1 is described as an example of a wireless terminal device.

Figure 1:
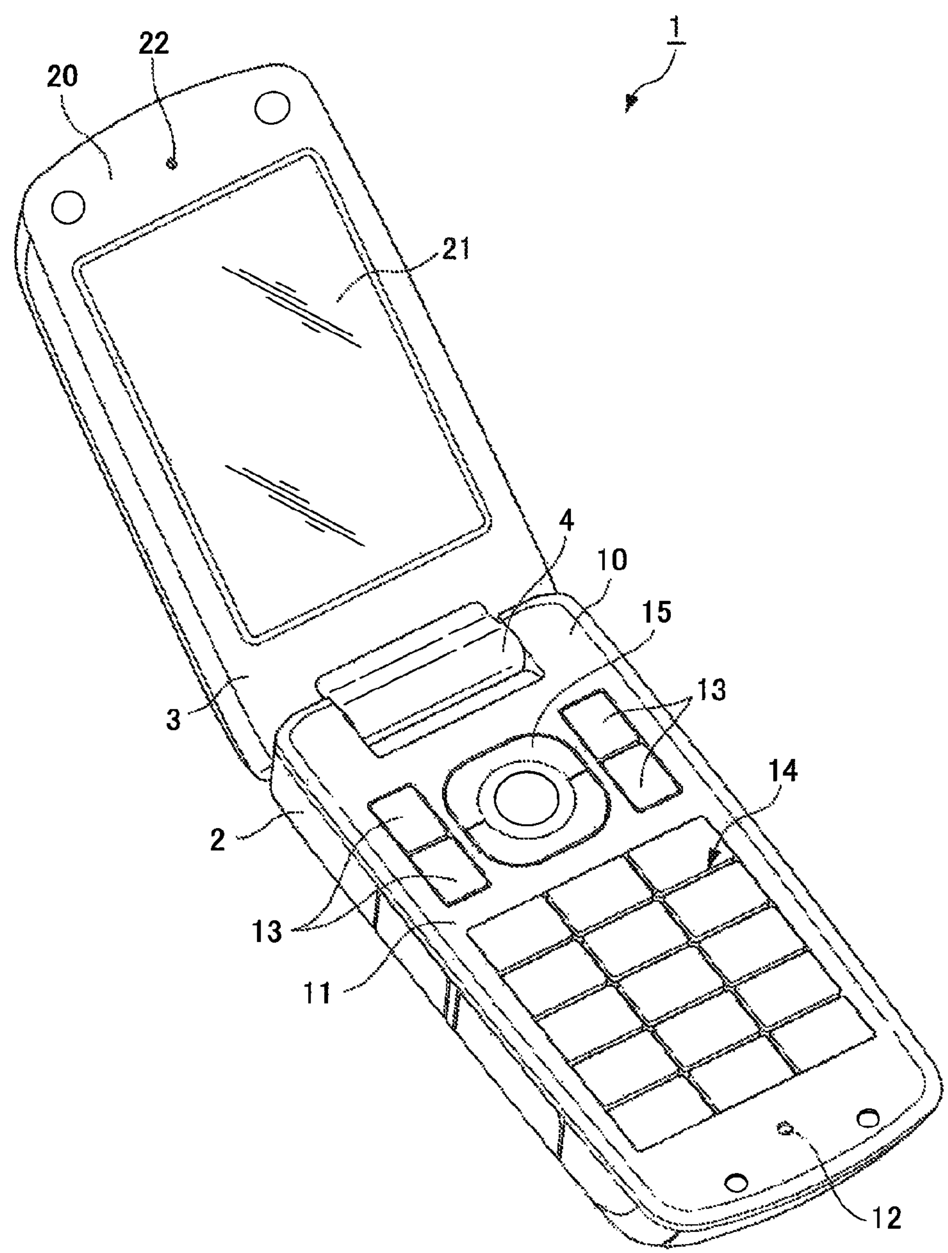
FIG. 1 is a perspective view showing an appearance of a cellular telephone device according to an embodiment of the present invention.

FIG. 1 is a perspective view showing an appearance of the cellular telephone device 1 according to the present embodiment.

It should be noted that, although FIG. 1 shows a so-called folder-type cellular telephone device, the cellular telephone device according to the present invention is not limited thereto. For example, the cellular telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 is input when the user is making a phone call or using a speech recognition application. The operation unit 11 is configured with: function setting operation buttons 13 for operating various functions such as for various setting functions, a telephone number directory function and a mail function; input operation buttons 14 for inputting the digits of a telephone number and characters for mail, etc.; and a selection operation button 15 for performing selection of various operations, scrolling, etc.

Moreover, the display unit side body 3 is configured to include, on a front face portion 20, a display unit 21 for displaying a variety of information, and a receiver 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be arranged into a state where the operation unit side body 2 and the display unit side body 3 are apart from each other (opened state), and into a state where the operation unit side body 2 and the display unit side body 3 are contacting each other (closed state), by relatively rotating the operation unit side body 2 and the display unit side body 3, which are connected via the hinge mechanism 4.

Figure 2:
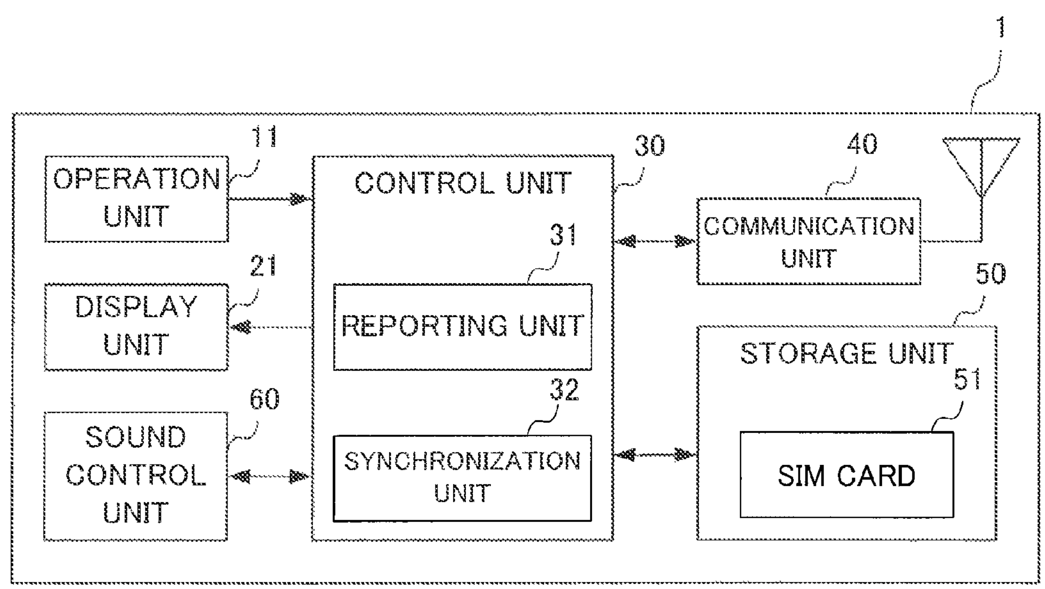
FIG. 2 is a block diagram showing functions of the cellular telephone device according to the embodiment of the present invention.

FIG. 2 is a block diagram showing functions of the cellular telephone device 1 according to the present embodiment.

The cellular telephone device 1 includes the operation unit 11, the display unit 21, a control unit 30, a communication unit 40, a storage unit 50, and a sound control unit 60.

The control unit 30 controls the entirety of the cellular telephone device 1, and performs, for example, predetermined control of each unit such as the display unit 21 and the communication unit 40. Moreover, the control unit 30 accepts input from the operation unit 11, the communication unit 40, etc. to perform a variety of processing. In addition, when executing such processing, the control unit 30 controls the storage unit 50 to read various programs and data and write data. It should be noted that detailed functions of the control unit 30 according to the present embodiment will be described later.

The communication unit 40 communicates with external devices (base stations) at a predetermined usable frequency band (for example, 2 GHz band, 800 MHz band, and the like). Furthermore, the communication unit 40 performs demodulation processing on a signal received via the antenna and provides the signal thus processed to the control unit 30, and in addition, performs modulation processing on a signal provided from the control unit 30 and transmits the signal to an external device via the antenna.

Here, in the present embodiment, the communication unit 40 conforms to both the W-CDMA and CDMA2000_1x standards that are communication protocols of the 3G standard for audio and data communication, and the LTE standard that is a communication protocol mainly used for high speed data transmission; therefore, the communication unit 40 can perform communication by selecting a communication system of either protocol. Based on an instruction from the control unit 30, the communication unit 40 communicates with a base station through any of the protocols. It should be noted that the cellular telephone device 1 shall perform communication preferentially through an LTE system (a first communication system) by way of the LTE standard (a first type communication method) when performing data communication, and shall switch to a 3G system (a second communication system) by way of the 3G standard (a second type communication method) when performing a voice call.

The storage unit 50 includes, for example, working memory, and is utilized for arithmetic processing by the control unit 30. Moreover, the storage unit 50 stores various programs and the like according to the present embodiment. Furthermore, the storage unit 50 includes an SIM card 51 (a contract information recording medium) that stores data for identifying a contracted communication common carrier, in addition to subscriber information. The control unit 30 determines a supported communication system based on an identified communication common carrier.

In accordance with control by the control unit 30, the sound control unit 60 performs predetermined sound processing on a signal transmitted from the communication unit 40, and outputs the signal thus processed to the receiver 22. The receiver 22 externally outputs the signal transmitted from the sound control unit 60. It should be noted that the signal may be output from a speaker (not illustrated) in place of the receiver 22 or in addition to the receiver 22. Moreover, in accordance with control by the control unit 30, the sound control unit 60 processes a signal, which is input from the microphone 12, and outputs the signal thus processed to the communication unit 40. The communication unit 40 performs predetermined processing on the signal transmitted from the sound control unit 60, and outputs the signal thus processed from the antenna.

Next, a detailed description is provided for functions of the control unit 30.

The control unit 30 includes a reporting unit 31 and a synchronization unit 32, and controls handoff from the LTE system to the 3G system in response to a request for voice communication.

In a case in which a communication request occurs in the 3G system in a state where the location registration is performed in the LTE system, the reporting unit 31 reports the communication request, together with data for identifying the 3G system, to the LTE system.

More specifically, the reporting unit 31 determines a supported communication system (W-CDMA or CDMA2000__1x), based on data for identifying a communication common carrier stored in the SIM card 51. In addition, the reporting unit 31 reports the communication request to the LTE system in a format defined in the communication system thus determined, and the control unit of the LTE system determines the communication system based on difference of the format, or type information included in the format, or the like.

It should be noted that determination of a communication system may be performed when the reporting unit 31 reports a communication request, or may be performed beforehand, such as when the power supply of the cellular telephone device 1 is turned on, or when an SIM card 51 is inserted. As a result, the processing load for transitioning to the 3G system is reduced.

The synchronization unit 32 receives synchronization information of the communication channel in the 3G system (W-CDMA or CDMA2000__1x) identified by the LTE system based on data reported from the reporting unit 31, and establishes synchronization with the communication channel to start communication.

At this point in time, the synchronization unit 32 receives, as synchronization information, an offset amount of the system time of the 3G system relative to the system time of the LTE system, together with identification data of the communication channel, and in addition, PN code offset and Walsh codes. The synchronization unit 32 acquires an allocated communication channel based on such synchronization information, and establishes synchronization with the communication channel.

Moreover, based on mapping data of the CS Fallback function, the control unit of the LTE system (hereinafter referred to as an LTE control unit) determines a calling zone of the 3G system corresponding to the calling zone of the LTE system, and transmits and receives various types of report data in collaboration with a control unit (hereinafter referred to as a 3G control unit) that manages this calling zone.

Figure 3:
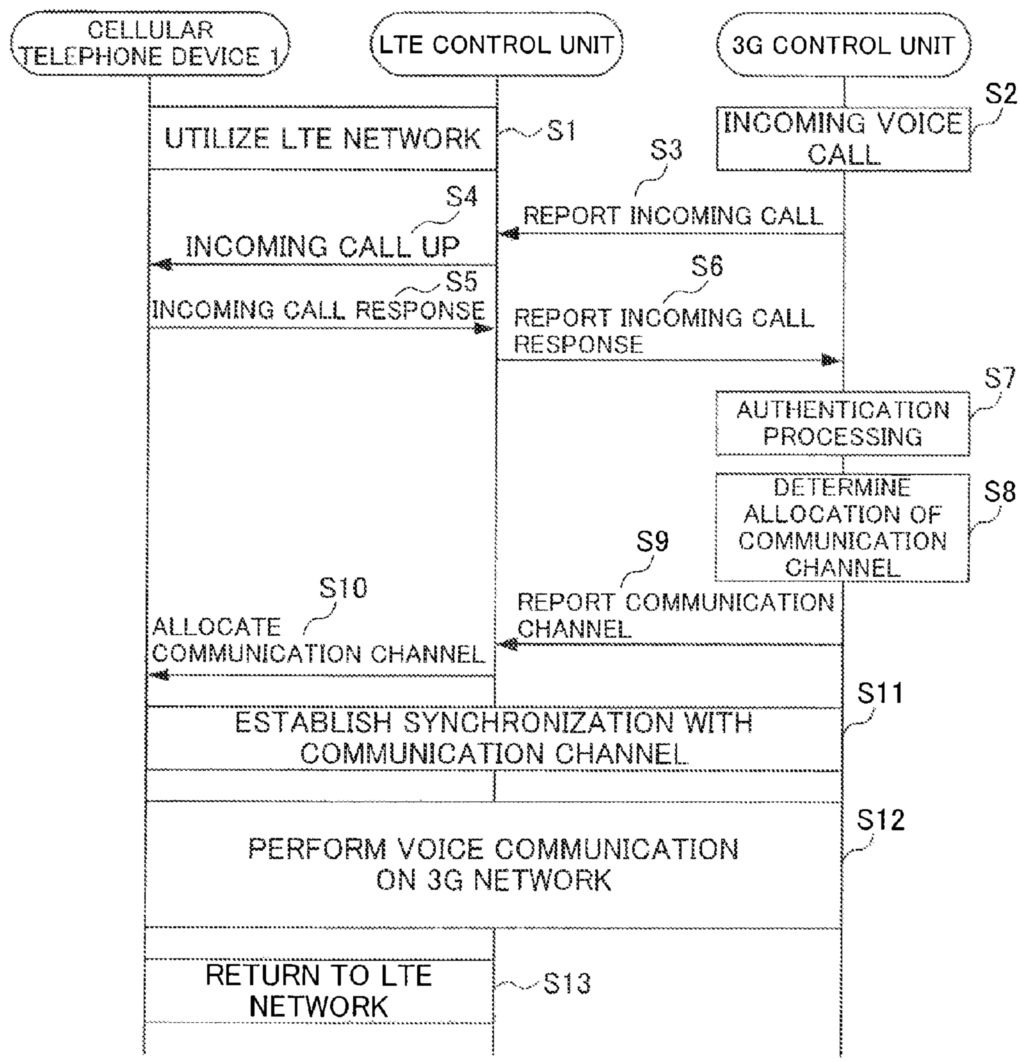
FIG. 3 is a sequence diagram showing processing in a case in which an incoming voice call occurs when utilizing a network of an LTE system according to the embodiment of the present invention.

FIG. 3 is a sequence diagram showing processing in a case in which an incoming voice call occurs when utilizing the network of the LTE system according to the present embodiment.

In Step S1, the cellular telephone device 1 is utilizing the network of the LTE system under the management of the LTE control unit.

In Step S2, the 3G control unit receives an incoming voice call for the cellular telephone device 1 in the 3G system. For example, there may be a case in which an incoming voice call occurs while browsing a web page in the LTE system.

In Step 3, the 3G control unit reports the incoming voice call of Step S2 to the LTE control unit via CS and EPC by way of the CS Fallback function.

In Step S4, the LTE control unit performs incoming call up for the cellular telephone device 1, based on the incoming voice call reported in Step S3.

In Step S5, the cellular telephone device 1 transmits an incoming call response to the incoming call up of Step S4 to the LTE control unit, in a format including type information of a 3G system supported by the SIM card 51.

In Step S6, the LTE control unit determines a type of the 3G system, based on the format of the incoming call response of Step S5, and reports the incoming call response to the 3G control unit that is associated with the determined 3G system by way of the mapping data, via EPC and CS.

In Step S7, the 3G control unit performs authentication processing to confirm that the cellular telephone device 1 that performed the incoming call response is an authorized user. It should be noted that this authentication processing is omissible.

In Step S8, the 3G control unit determines a communication channel to be allocated in the 3G system, such that the cellular telephone device 1 that performed the incoming call response performs a voice call.

In Step S9, the 3G control unit reports synchronization information for establishing synchronization with the communication channel allocated in Step S8 to the LTE control unit, via CS and EPC.

In Step S10, the LTE control unit reports, to the cellular telephone device 1, the synchronization information for establishing synchronization with the communication channel of the 3G system reported in Step S9. At this point in time, the LTE control unit calculates an offset amount of the system time used in the 3G system through comparison with the LTE system, and uses the offset amount as a part of the synchronization information.

In Step S11, the cellular telephone device 1 establishes synchronization with the communication channel by using the synchronization information obtained in Step S10, and establishes communication with the 3G system.

In Step S12, the cellular telephone device 1 performs voice communication on the network of the 3G system by using the communication channel synchronized in Step S11.

In Step S13, when the voice communication in Step S12 is completed, the cellular telephone device 1 returns to the network of the LTE system that is given priority over the 3G system.

Figure 4:
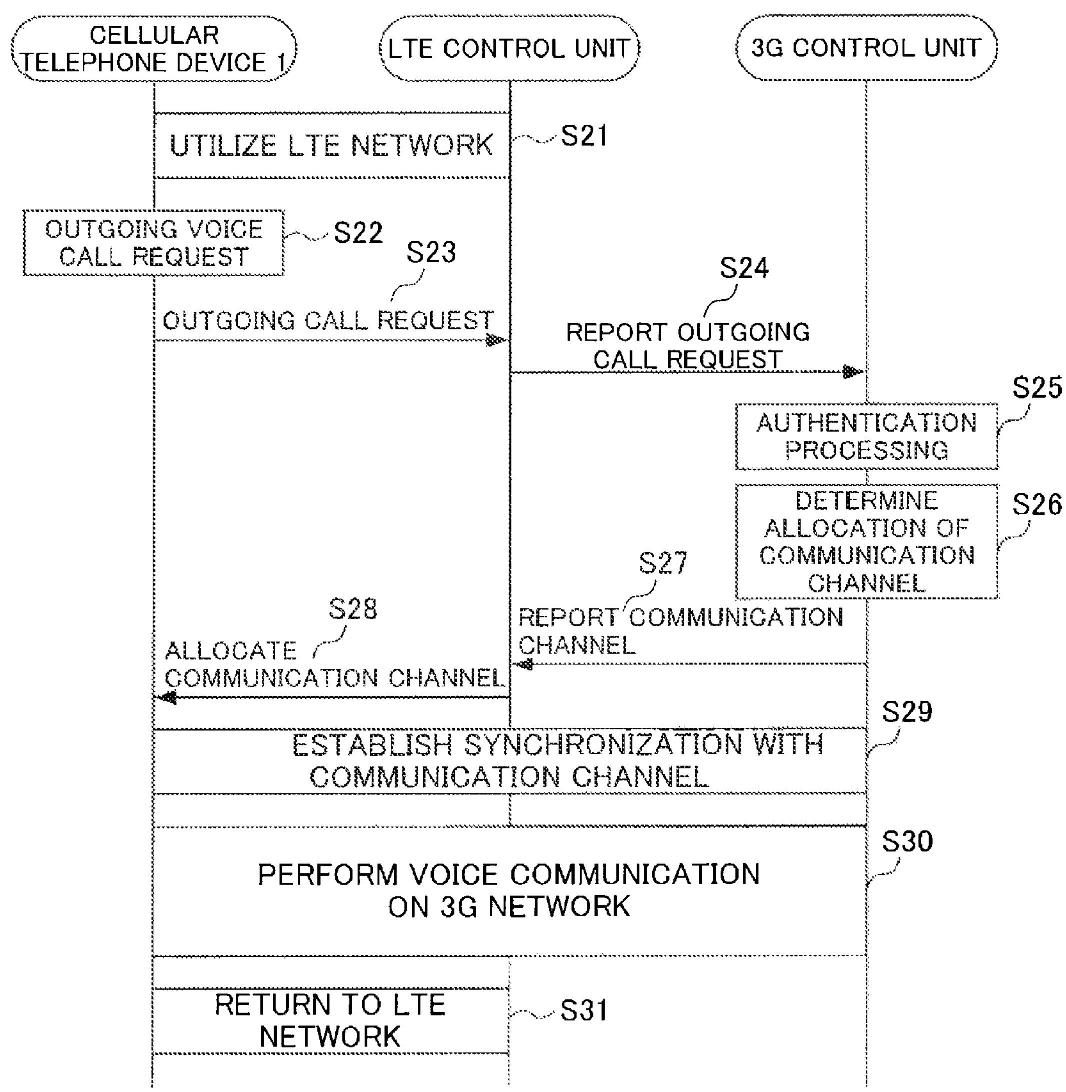
FIG. 4 is a sequence diagram showing processing in a case in which an outgoing voice call is requested when utilizing the network of the LTE system according to the embodiment of the present invention.

FIG. 4 is a sequence diagram showing processing in a case in which an outgoing voice call is requested when utilizing the network of the LTE system according to the present embodiment.

In Step S21, the cellular telephone device 1 is utilizing the network of the LTE system under the management of the LTE control unit.

In Step S22, the cellular telephone device 1 accepts an outgoing voice call request from the user via the operation unit 11 or the like. For example, when selecting a character string, to which a Phone to function is allocated (i.e. which has a tag linked to a telephone number) by way of the operation unit 11 while browsing a web page, an outgoing voice call request will occur during the data communication in the LTE system.

In Step S23, the cellular telephone device 1 reports the outgoing call request accepted in Step S22 to the LTE control unit of the LTE system in which the location registration is performed, in a format including type information of a 3G system supported by the SIM card 51.

In Step S24, the LTE control unit determines a type of the 3G system, based on the format of the outgoing call request of Step S23, and reports the outgoing call request, via EPC and CS, to the 3G control unit that is associated with the determined 3G system by way of the mapping data.

In Step S25, the 3G control unit performs authentication processing to confirm that the cellular telephone device 1 that performed the outgoing call request is an authorized user. It should be noted that this authentication processing is omissible.

In Step S26, the 3G control unit determines a communication channel to be allocated in the 3G system, such that the cellular telephone device 1 that performed the outgoing call request performs a voice call.

In Step S27, the 3G control unit reports synchronization information for establishing synchronization with the communication channel allocated in Step S26 to the LTE control unit via CS and EPC.

In Step S28, the LTE control unit reports, to the cellular telephone device 1, the synchronization information for establishing synchronization with the communication channel of the 3G system reported in Step S27. At this point in time, the LTE control unit calculates an offset amount of the system time used in the 3G system through comparison with the LTE system, and uses the offset amount as a part of the synchronization information.

In Step S29, the cellular telephone device 1 establishes synchronization with the communication channel by using the synchronization information obtained in Step S28, and establishes communication with the 3G system.

In Step S30, the cellular telephone device 1 performs voice communication on the network of the 3G system by using the communication channel synchronized in Step S29.

In Step S31, when the voice communication in Step S30 is completed, the cellular telephone device 1 returns to the network of the LTE system that is given priority over the 3G system.

As described above, according to the present embodiment, when transitioning from the LTE system to the 3G system to start voice communication, the cellular telephone device 1 reports a communication request, in which the corresponding 3G system is designated, to the LTE system, and obtains information for establishing synchronization with a communication channel of the 3G system, from the LTE system. Therefore, since the cellular telephone device 1 accesses the 3G system via the LTE system without acquiring the 3G system, the volume of software for supporting the 3G system can be reduced. More specifically, it is possible to reduce the storage area for programs, system information, etc. regarding selection of a communication system, an acquiring operation, obtaining of standby information, and an accessing operation, which are processes in the first half of the call control.

Moreover, since the cellular telephone device 1 itself reports data for identifying a corresponding communication system to the LTE control unit, the cellular telephone device 1 can easily establish synchronization with a communication channel of a corresponding communication system, even in a case in which a plurality of 3G systems are present. Therefore, the cellular telephone device 1 can communicate with each of the plurality of 3G systems, and can reduce the volume of software for the aforementioned call control.

Furthermore, in handoff from the LTE system to the 3G system when staring voice communication, the cellular telephone device 1 receives an offset amount between the system time of the LTE system and the system time of the 3G system; therefore, the cellular telephone device 1 can easily acquire a communication channel to establish synchronization therewith. Therefore, the cellular telephone device 1 can reduce the processing load required for transitioning to the 3G system, and can shorten the processing time thereof.

Moreover, in the cellular telephone device 1, since a communication channel in a calling zone of the 3G system is allocated based on mapping data of the CS Fallback function, a communication channel with which synchronization can be established is easily determined, and the processing load is reduced.

Although an embodiment of the present invention has been described above, the present invention is not limited to the aforementioned embodiment. Moreover, the effects described in the embodiment of the present invention merely exemplify the most preferable effects arising from the present invention, and the effects according to the present invention are not limited to those described in the embodiment of the present invention.

The W-CDMA or CDMA2000_1x standard and the LTE standard in the aforementioned embodiment are merely examples, and another communication protocol may be employed. As long as collaboration is established between zones when performing a location registration, for example, a GSM standard and another standard specialized in data communication may be similarly employed.

Moreover, the wireless terminal device according to the present invention is not limited to the cellular telephone device 1. The present invention can be applied to various devices such as a PHS (trademark: Personal Handyphone System), a PDA (Personal Digital Assistant), a gaming machine, a navigation device, a personal computer, a communication-dedicated module specialized in communication functions, and the like.

What is claimed is:

1. A wireless terminal device that performs wireless communication by selecting any one of a first communication system or a second communication system, the wireless terminal device comprising:

a reporting unit that reports data for identifying the second communication system to the first communication system, in a case in which a communication request occurs in the second communication system in a state where a location registration is performed in the first communication system; and a synchronization unit that receives, from the first communication system, synchronization information of a communication channel in the second communication system allocated based on data reported from the reporting unit, and establishes synchronization with the communication channel.

2. The wireless terminal device according to claim 1, wherein the second communication system is one of a plurality of communication systems that use a prescribed communication method.

3. The wireless terminal device according to claim 1, wherein the synchronization unit receives, as the synchronization information, together with data for identifying a communication channel, an offset amount of system time of the second communication system relative to system time of the first communication system.

4. The wireless terminal device according to claim 1, wherein the synchronization unit establishes synchronization with a base station in a calling zone of the second communication system corresponding to a calling zone of the first communication system, based on mapping data of a CS Fallback function maintained in the first communication system and defined in 3GPP TS 23.272.

5. The wireless terminal device according to claim 1, further comprising:

a detachable contract information recording medium, wherein the reporting unit generates data for identifying the second communication system, based on information on a contracted communication common carrier recorded in the contract information recording medium.

6. A wireless terminal device that performs wireless communication by selecting any one of a first communication system or a second communication system, the wireless terminal device comprising:

a reporting unit, wherein, in a case in which an incoming call occurs in the second communication system in a state where a location registration is performed in the first communication system, the reporting unit receives an incoming call report regarding the incoming call in the first communication system, and reports data for identifying the second communication system to the first communication system in response to the incoming call report; and a synchronization unit that receives, from the first communication system, synchronization information of a communication channel in the second communication system allocated based on data reported from the reporting unit, and establishes synchronization with the communication channel.

7. The wireless terminal device according to claim 6, wherein the second communication system is one of a plurality of communication systems that use a prescribed communication method.

8. The wireless terminal device according to claim 6, wherein the synchronization unit receives, as the synchronization information, together with data for identifying a communication channel, an offset amount of system time of the second communication system relative to system time of the first communication system.

9. The wireless terminal device according to claim 6, wherein the synchronization unit establishes synchronization with a base station in a calling zone of the second communication system corresponding to a calling zone of the first communication system, based on mapping data of a CS Fallback function maintained in the first communication system and defined in 3GPP TS 23.272.

10. The wireless terminal device according to claim 6, further comprising:

a detachable contract information recording medium, wherein the reporting unit generates data for identifying the second communication system, based on information on a contracted communication common carrier recorded in the contract information recording medium.

11. A control method for a wireless terminal device that performs wireless communication by selecting any one of a first communication system or a second communication system, the method comprising: a reporting step of the wireless terminal device reporting data for identifying the second communication system to the first communication system, in a case in which a communication request occurs in the second communication system in a state where a location registration is performed in the first communication system; and a synchronization step of the wireless terminal device receiving, from the first communication system, a communication channel in the second communication system allocated based on data reported in the reporting step, and establishing synchronization with the communication channel.

12. A control method for a wireless terminal device that performs wireless communication by selecting any one of a first communication system or a second communication system, the method comprising: a reporting step, wherein, in a case in which an incoming call occurs in the second communication system in a state where a location registration is performed in the first communication system, an incoming call report regarding the incoming call is received by the wireless terminal device in the first communication system, and data for identifying the second communication system is reported by the wireless terminal device to the first communication system in response to the incoming call report; and a synchronization step of the wireless terminal device receiving, from the first communication system, synchronization information of a communication channel in the second communication system allocated based on data reported in the reporting step, and establishing synchronization with the communication channel.

* * * * *